(12) United States Patent
Genovese et al.

(10) Patent No.: US 10,253,864 B2
(45) Date of Patent: Apr. 9, 2019

(54) BEARING WAVE GENERATOR ASSEMBLY

(71) Applicant: OPTIMAL ACTUATION, INC., Jacksonville, FL (US)

(72) Inventors: Vincent Genovese, Ponte Vedra Beach, FL (US); Yefim Epshetsky, Shaumburg, IL (US)

(73) Assignee: Optimal Actuation Inc., Jacksonville, FL (US)

( * ) Notice: Subject to any disclaimer, the term of this patent is extended or adjusted under 35 U.S.C. 154(b) by 0 days.

(21) Appl. No.: 15/904,388

(22) Filed: Feb. 25, 2018

(65) Prior Publication Data

US 2019/0003567 A1    Jan. 3, 2019

Related U.S. Application Data

(60) Provisional application No. 62/604,369, filed on Jul. 3, 2017.

(51) Int. Cl.
*F16H 49/00* (2006.01)
*F16C 19/06* (2006.01)
*F16C 33/58* (2006.01)

(52) U.S. Cl.
CPC .......... *F16H 49/001* (2013.01); *F16C 19/06* (2013.01); *F16C 33/585* (2013.01); *F16H 2049/003* (2013.01)

(58) Field of Classification Search
CPC .......... F16C 33/60; F16C 19/06; F16C 33/58; F16C 33/583; F16C 33/585; F16H 49/001; F16H 2049/003
See application file for complete search history.

(56) References Cited

U.S. PATENT DOCUMENTS

| 3,196,713 | A | * | 7/1965 | Robinson | F16H 49/001 74/17.8 |
|---|---|---|---|---|---|
| 4,715,247 | A | * | 12/1987 | Honda | F16H 49/001 384/523 |
| 4,746,232 | A | * | 5/1988 | Gugel | F16C 19/362 384/447 |
| 4,823,638 | A | * | 4/1989 | Ishikawa | F16C 19/50 74/462 |
| 2002/0174742 | A1 | * | 11/2002 | Kobayashi | F16C 33/60 74/640 |

(Continued)

FOREIGN PATENT DOCUMENTS

JP        2005214330 A  *  8/2005  ............ F16C 19/166

OTHER PUBLICATIONS

Machine Translation of JP-2005214330-A (Year: 2005).*

*Primary Examiner* — Alan B Waits
(74) *Attorney, Agent, or Firm* — Inventa Capital PLC

(57) ABSTRACT

A bearing assembly includes a first bearing part and a second bearing part each including a central portion and a side peripheral wall, an opening to engage a shaft rotatable about a central axis. The central portions may include a plurality of openings to receive numerous pins and other male elements to connect with the bearing parts. The bearing assembly includes an outer ring. The first bearing part and the second bearing part includes a first radial chamfer and a second radial chamfer, extending between the respective central portions and the side peripheral walls. When both the first bearing part and the second bearing part are joined together, they define a V-shaped groove presenting an elliptical configuration.

1 Claim, 5 Drawing Sheets

(56) References Cited

U.S. PATENT DOCUMENTS

| | | | |
|---|---|---|---|
| 2008/0210182 A1* | 9/2008 | Schaefer | F01L 1/34 |
| | | | 123/90.17 |
| 2010/0319484 A1* | 12/2010 | Kanai | F16H 55/0833 |
| | | | 74/640 |
| 2012/0085188 A1* | 4/2012 | Kurogi | F16H 49/001 |
| | | | 74/411 |
| 2013/0305864 A1* | 11/2013 | Schaefer | F16H 49/001 |
| | | | 74/412 R |
| 2014/0334759 A1* | 11/2014 | Nien | F16H 49/001 |
| | | | 384/513 |
| 2015/0240928 A1* | 8/2015 | Jones | F16H 49/001 |
| | | | 74/413 |
| 2016/0186809 A1* | 6/2016 | Maeoka | F16C 33/418 |
| | | | 384/523 |
| 2017/0002912 A1* | 1/2017 | Kliber | F16C 33/6603 |
| 2017/0059024 A1* | 3/2017 | Kiyosawa | F16H 49/001 |
| 2017/0175869 A1* | 6/2017 | Kiyosawa | F16H 1/32 |
| 2017/0186453 A1* | 6/2017 | Iino | F16C 19/166 |
| 2017/0198802 A1* | 7/2017 | Kiyosawa | F16H 1/32 |
| 2017/0254402 A1* | 9/2017 | Gilges | F16H 49/001 |
| 2017/0254403 A1* | 9/2017 | Kobayashi | F16H 1/32 |
| 2018/0023678 A1* | 1/2018 | Kobayashi | F16C 33/4605 |
| | | | 74/640 |
| 2018/0051789 A1* | 2/2018 | Mendel | F16C 33/581 |

\* cited by examiner

BEARING WAVE GENERATOR ASSEMBLY

This application claims priority to U.S. provisional application Ser. No. 62/604,369 filed on Jul. 3, 2017, and incorporated herewith by reference in its entirety.

FIELD OF THE INVENTION

This invention relates generally to a strain wave gearing transmissions and more particularly to a supportive bearing assembly for generating waves inside the strain wave gearing transmission.

BACKGROUND OF THE INVENTION

Typical strain wave gearing assembly includes three basic components: a wave generator, a flex spline, and a circular spline. The wave generator is made up of two separate parts: an elliptical disk called a wave generator plug and an outer ball bearing. Teeth are positioned radially around the outside of the flex spline. The flex spline fits tightly over the wave generator, so that when the wave generator plug is rotated, the flex spline deforms to the shape of a rotating ellipse and does not slip over the outer elliptical ring of the ball bearing. The circular spline is a rigid circular ring with teeth on the side. The flex spline and wave generator are placed inside the circular spline, meshing the teeth of the flex spline and the circular spline. Because the flex spline is deformed into an elliptical shape, its teeth only actually mesh with the teeth of the circular spline in two regions on opposite sides of the flex spline.

When the wave generator plug rotates, the flex spline teeth which are meshed with those of the circular spline, slowly change position. For every full rotation of the wave generator, the flex spline would be required to rotate a slight amount backward relative to the circular spline. Thus, the rotation action of the wave generator results in a much slower rotation of the flex spline in the opposite direction.

This prior art design has numerous drawbacks associated with the designs. The wave generator plug deforms the bearing in to the shape of an ellipse thereby reducing the life of the bearing.

Accordingly, there remains a need for an improved harmonic drive assembly that will eliminate the aforementioned drawbacks associated with the prior art design.

SUMMARY OF THE INVENTION

The bearing assembly of the present invention includes a first bearing part and a second bearing part each including a central portion and a side peripheral wall, an opening to engage a shaft rotatable about a central axis. The central portions may include a plurality of openings to receive numerous pins and other male elements (not shown) to connect with the bearing parts. The bearing assembly includes an outer ring or race. The outer ring is used to surround the first bearing part and the second bearing part and presents a void portion. The ring also includes a first V-shaped groove defined there inside to hold bearing balls engaged by a separator or a cage.

The first bearing part and the second bearing part includes a first radial chamfer and a second radial chamfer, extending between the respective central portions and the side peripheral walls. When both the first bearing part and the second bearing part are joined together, they define a second V-shaped groove positioned in opposite to the first V-shaped groove to form a radial nest to hold the bearing balls relative to each other by the separator. The second V-shaped groove, formed by both of the first bearing part and the second bearing part are joined together, presents an elliptical configuration. Contrary, the first V-shaped groove defined in the outer ring is not elliptical but is circular instead.

Alluding to the above, the elliptical shape is achieved by differences in formation of the chamfers when both the first bearing part and the second bearing part are formed, when formed, have various angles defined between the respective central portions and the respective side peripheral walls.

As the bearing assembly is rotated about the axis, the elliptical groove formed by the first and second radial chamfers acts like a track to allow the bearing balls to ride there along and force the bearing balls to move in wave like mode thereby deforming the outer ring, which in turn, as deformed, translates further on momentum of deformation to the flexspline and then from the flexpline to the circular spline, which rotates at the same speed as the flexspline.

DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
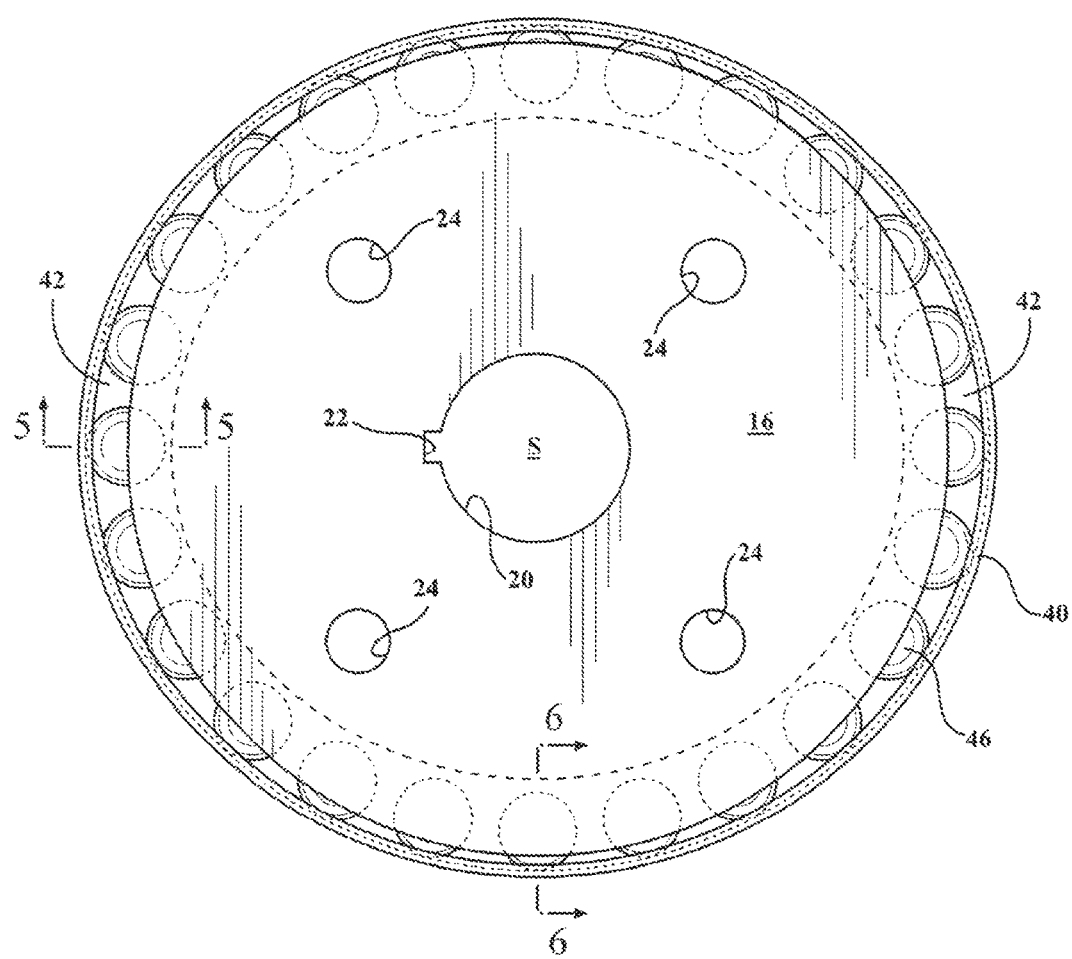
FIG. 1 shows a top view of an inventive bearing wave generator assembly.
Figure 2:
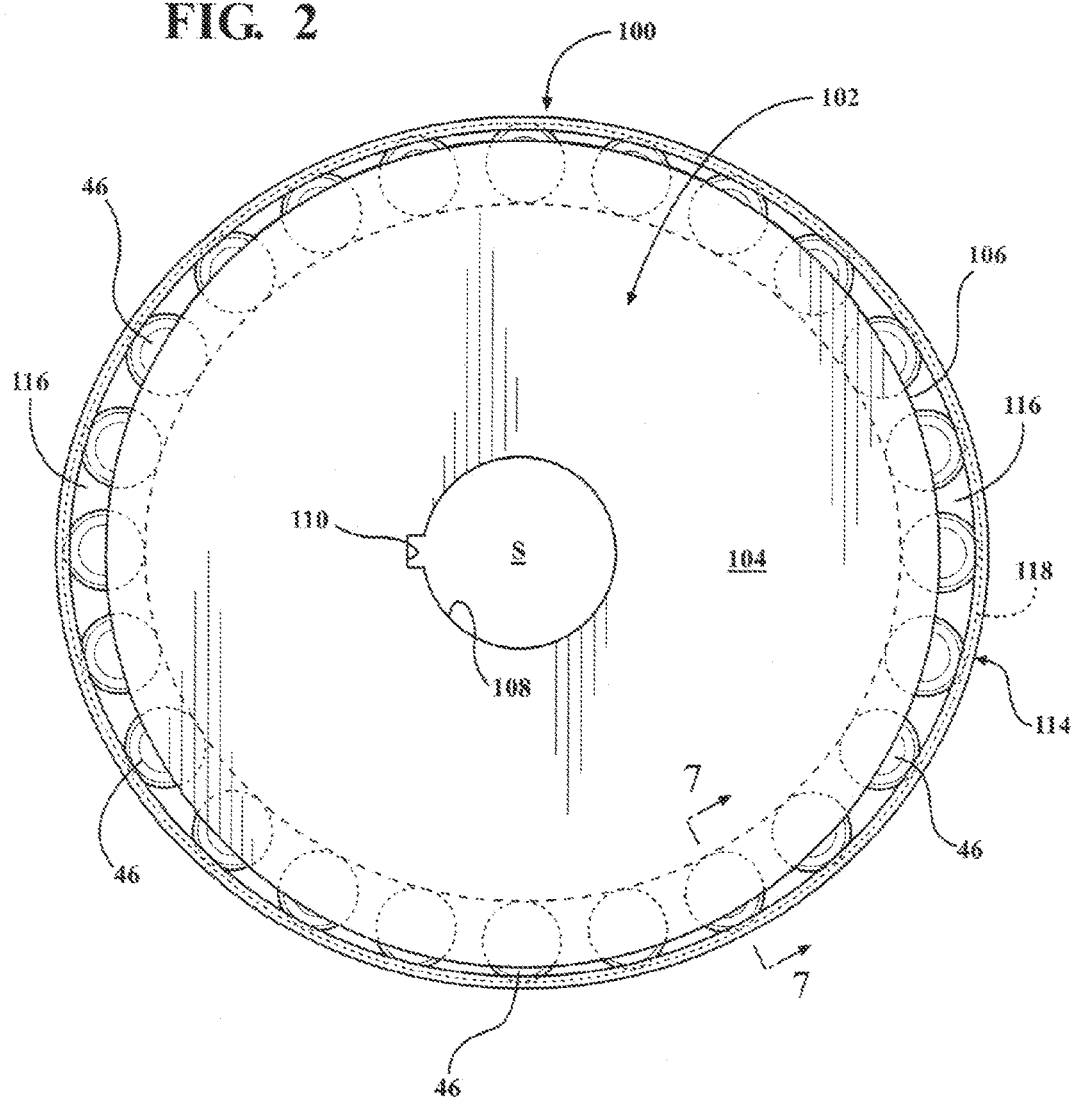
FIG. 2 shows a top view of an alternative embodiment of the bearing wave generator assembly.
Figure 3:
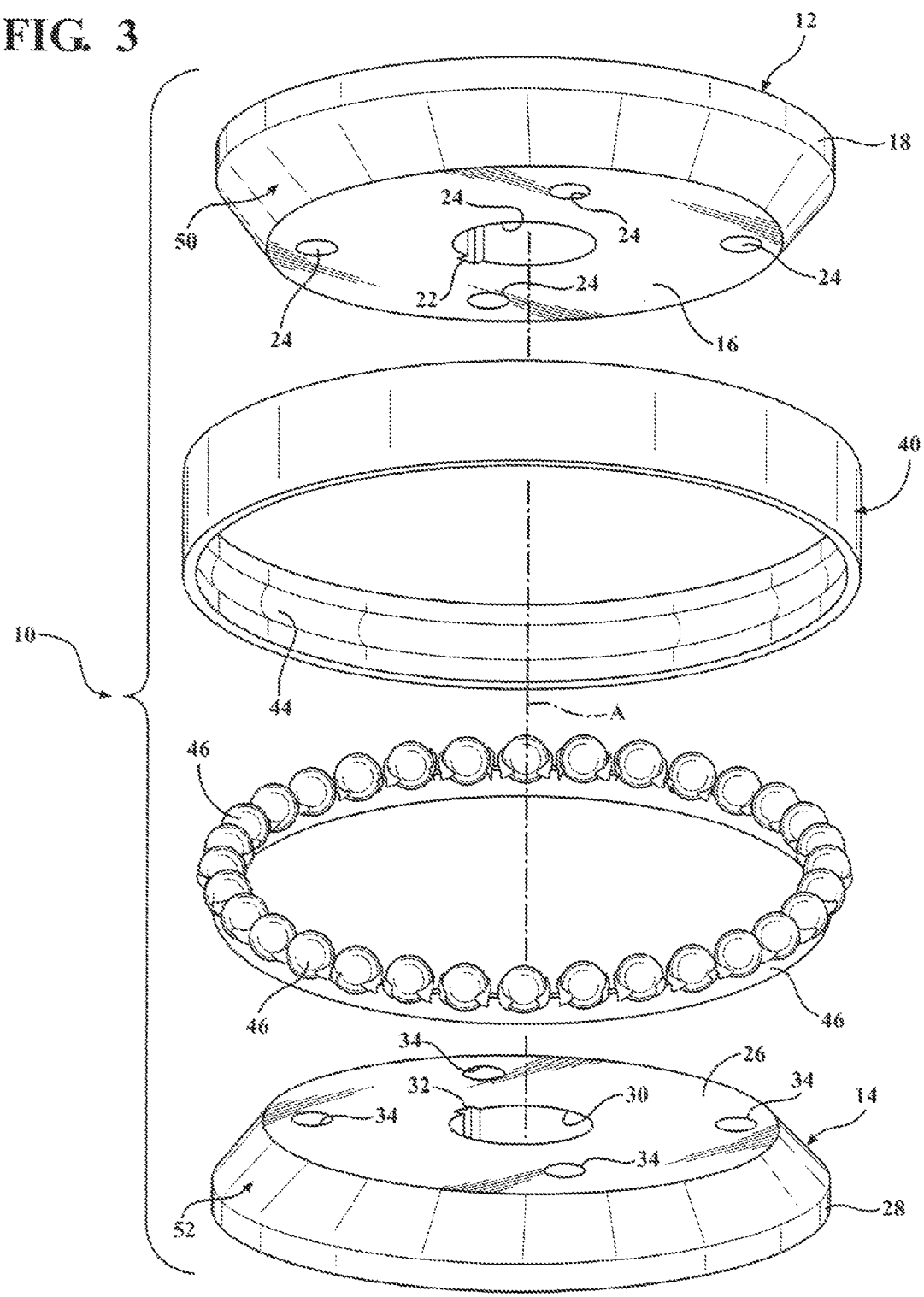
FIG. 3 shows an exploded view of the bearing wave generator assembly.

A bearing wave generator assembly (here and after as the bearing assembly) of the present invention is generally shown at 10 in FIGS. 1, 2, and 3. The bearing assembly 10 includes a first bearing part generally indicated at 12 and a second bearing part generally indicated at 14. The first bearing part 12 includes a central portion 16 and a side peripheral wall 18. The central portion 16 defines an opening 20 to engage a shaft, shown at S in FIG. 1, rotatable about a central axis A. The opening 18 extends into a keyway 22 presenting a rectangular configuration that is not intended to limit the scope of the present invention. Those skilled in the art will appreciate, that the keyway 22 may present different configurations and shapes without limiting the scope of the present invention. Alternative, the central portion 16 may include a plurality of openings 24 to receive numerous pins and other male elements (not shown) to connect with the second bearing part 14.

The first bearing part 14 is identical to the first bearing part 12 and includes a central portion 26 and a side peripheral wall 28. The central portion 26 defines an opening 30 to engage the shaft S. The opening 30 extends into a keyway 32 presenting a rectangular configuration that is not intended to limit the scope of the present invention. The central portion 26 may include a plurality of openings 34 to receive numerous pins and other male elements (not shown) to connect with the first bearing part 12.

Figure 5:
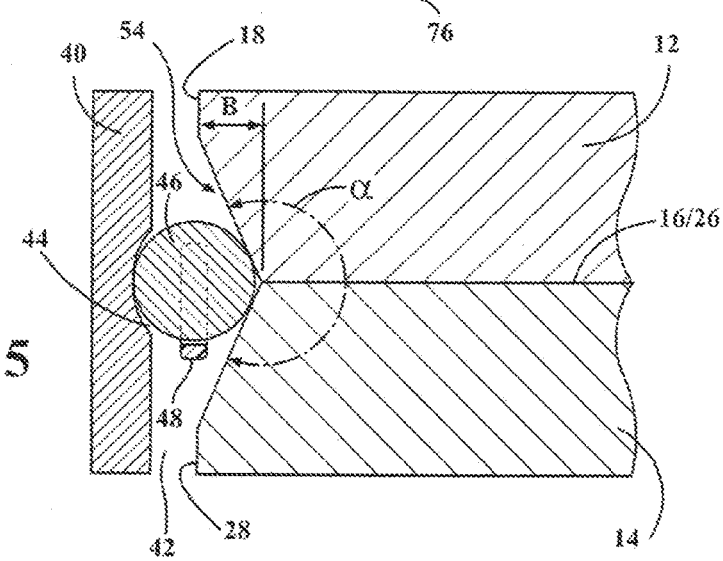
FIGS. 5 and 6 show a partial side and cross-sectional view of the parts of the bearing wave generator assembly presenting the chamfer formed in the shape of the ellipse on each of the bearing parts wherein each chamfer present different angles of inclination thereby presenting the chamfer formed in the shape of the ellipse.
Figure 6:
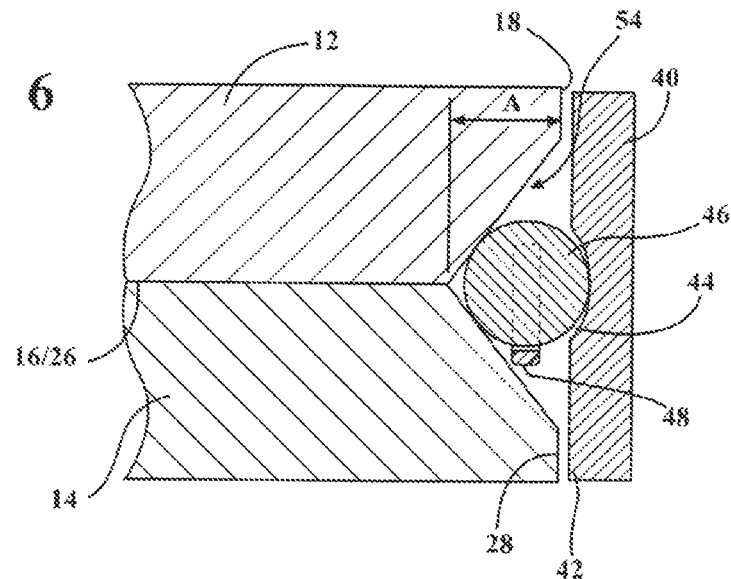
Figure 7:
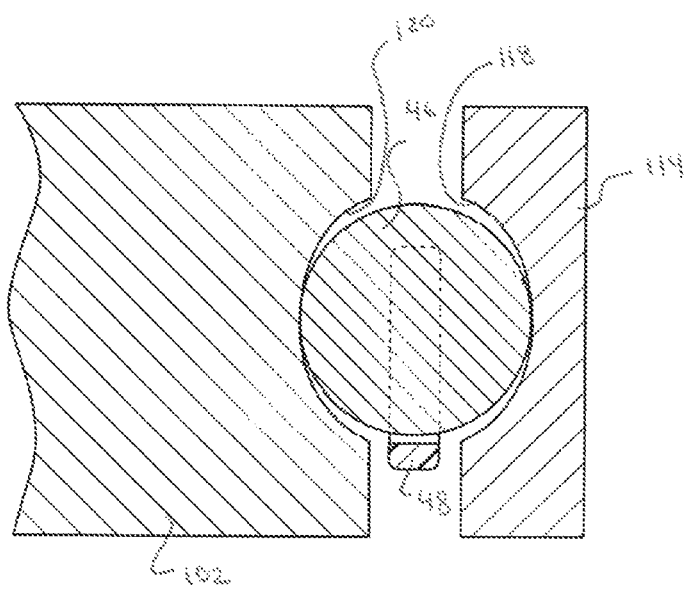
FIG. 7 shows a partial side and cross-sectional view of the parts of the bearing wave generator assembly of the alternative embodiment as shown in FIG. 2.

The bearing assembly 10 includes an outer ring or race, generally indicated at 40. The outer ring 40 is used to surround the first bearing part 12 and the second bearing part 14 and presents a void portion 42, as best shown in FIGS. 1, 5 and 6. The ring 40 also includes a first V-shaped groove 44 defined there inside to hold bearing balls 46 engaged by a separator or a cage 48 as to be explained in detailed further below. Those skilled in the art will appreciate that the first groove 44 may presents shapes other than V-shape and the current shape of the first groove 44 is not intended to limit the scope of the present invention.

FIG. 2 shows a top view of an alternative embodiment of the bearing wave generator assembly 10 shown in FIG. 1. The alternative bearing wave generator assembly is generally shown at 100 in FIG. 2. The bearing assembly 100 includes a uniformed bearing part generally indicated at 102, a central portion 104 and a side peripheral wall 106. The central portion 104 defines an opening 108 to engage the shaft S, rotatable about the central axis A. The opening 108 extends into a keyway 110 presenting a rectangular configuration that is not intended to limit the scope of the present invention. Those skilled in the art will appreciate, that the keyway 110 may present different configurations and shapes without limiting the scope of the present invention.

The bearing assembly 100 includes an outer ring or race, generally indicated at 114. The outer ring 114 is used to surround the bearing part 104 and presents a void portion 116. The ring 114 also includes a first V-shaped groove 118 defined there inside to hold bearing balls 46. Those skilled in the art will appreciate that the first groove 118 may presents shapes other than V-shape and the current shape of the first groove 118 is not intended to limit the scope of the present invention. The uniformed bearing part 102 includes a radial groove formed in an elliptical shape.

Referring now to FIGS. 1 through 6, the novel feature of the elliptical groove will be discussed. As best shown in FIGS. 3, 5, and 6, the first bearing part 12 and the second bearing part 14 includes a first radial chamfer, generally indicated at 50, extending between the central portion 16 and the side peripheral wall 18. Similarly, the second bearing part 14 also includes a second radial chamfer, generally indicated at 52, extending between the central portion 26 and the side peripheral wall 28.

Alluding to the above, when both the first bearing part 12 and the second bearing part 14 are joined together, as best shown in FIGS. 5 and 6, they define a second V-shaped groove 54 positioned in opposite to the first V-shaped groove 44 to form a radial nest to hold the bearing balls 46 relative to each other by the separator 46. Those skilled in the art will appreciate that the second V-shaped groove 54 may presents shapes other than V-shape and the current shape of the second V-shaped groove 54 is not intended to limit the scope of the present invention.

Figure 4:
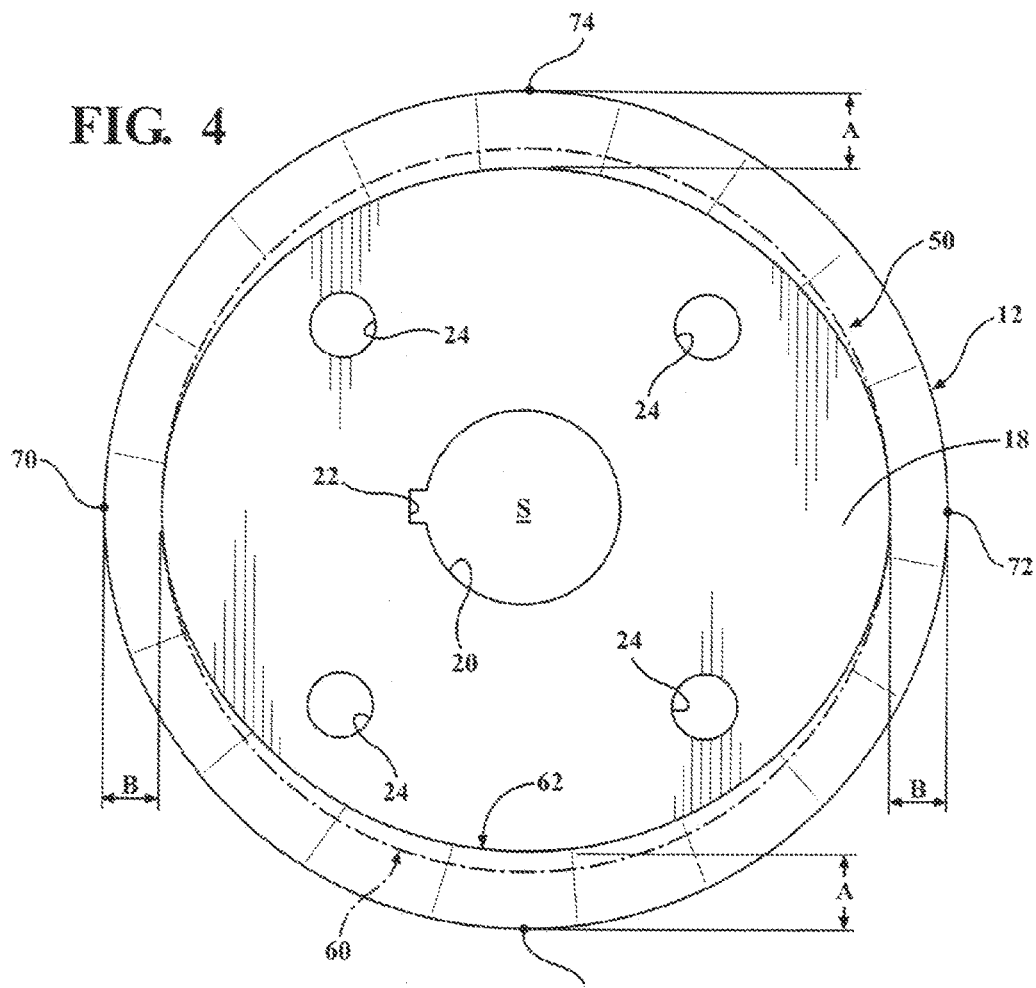
FIG. 4 shows a top view of one of the parts of the bearing wave generator assembly presenting a chamfer formed in the shape of an ellipse.

As better shown in FIGS. 1 and 4, the second V-shaped groove 54, formed by both of the first bearing part 12 and the second bearing part 14 are joined together, presents an elliptical configuration. FIG. 1 shows a top view of the bearing assembly 10 presented in more exaggerated and simplified way for better explanation and understanding of the inventive concept of the elliptical configuration of the second V-shaped groove 54 formed by the first radial chamfer 50 and the second radial chamfer 52 as will be explained further with reference to FIGS. 4 through 6. The first radial chamfer 50 and the second radial chamfer 52, as best shown in FIG. 5, when joined together, define an alpha angle of about 120 degrees. Those skilled in the art will appreciate that this angle can be less than 120 degrees or more that 120 degrees and do not intend to limit the scope of the present invention.

FIG. 4 shows a top and simplified view of the first bearing part 12, which is identical to the second bearing part 14. FIG. 4 clearly shows that the first radial chamfer 50 is formed under the angle. For explanatory purposes, a phantom line, generally indicated at 60 shown an inner chamfer as if it was formed as a perfect circular shape being non-elliptical. The solid line, generally indicated at 62 shows an elliptical shape according to the present invention so it is clearly shown that the first radial chamfer 50 is formed in an elliptical shape. Even, as stated above, FIG. 3 only shows a top and simplified view of the first bearing part 12 same principle apply to formation of the second radial chamfer 52. Contrary, the first V-shaped groove 44 defined in the outer ring 40 is not elliptical but is circular instead.

Referring back to FIGS. 4 through 6, the elliptical shape is achieved by differences in formation of the chamfers 50 and 52 when both the first bearing part 12 and the second bearing part 14 are formed. As best shown in FIG. 4, each of the first bearing part 12 and the second bearing part 14, when formed have various angles defined between the respective central portions 16 and 26 and the respective side peripheral walls 18 and 28. For example, FIG. 5 shows a first inclination B taken at positions 70 and 72, defining a first angle shown at B in FIGS. 3 and 4.

Alluding to the above, FIG. 6 shows a second inclination A taken at positions 74 and 76, defining a second angle shown at A in FIGS. 4 and 6 wherein both angles A and B are different from one another thereby forming an elliptical shape when the second groove 54 is formed. The same second groove 54 is also formed in the uniformed bearing part 102 of the alternative bearing wave generator assembly, generally shown at 100 in FIG. 2.

As the bearing assembly 10 is rotated about the axis A, the elliptical groove 54 formed by the first and second radial chamfers 50 and 52 acts like a track to allow the bearing balls 46 to ride there along and force the bearing balls 46 to move in wave like mode thereby deforming the outer ring 40, which in turn, as deformed, translates further on momentum of deformation to the flexspline (not shown) and then from the flexspline to the circular spline (not shown), which rotates at the same speed as the flexspline.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A bearing wave generator assembly comprising:
a bearing part including an opening to engage a shaft rotatable about a central axis;

an outer ring presenting a first groove defined therein;

a separator to engage bearing balls; and said bearing part presenting a second groove positioned opposite to said first groove to form a radial nest to hold said bearing balls relative to each other, said second groove presenting an elliptical configuration to allow said bearing balls to ride there along and force said bearing balls to move in a wave like mode thereby deforming said outer ring, which in turn, as deformed, translates further on momentum of deformation away from said outer ring;

wherein said bearing part is further defined by a first bearing part and a second bearing part each including a central portion, a side peripheral wall, and an opening to engage said shaft rotatable about the central axis wherein said first bearing part includes a first radial chamfer and said second bearing part includes a second radial chamfer, extending between said central portions and said side peripheral walls, respectively, to form said second groove positioned in opposite to said first groove to form said radial nest to hold said bearing balls relative to each other; and wherein each said first radial chamfer and said second radial chamfer of said first bearing part and said second bearing part are formed to have at least two angles defined between the respective central portions and the respective side peripheral walls to present a first inclination at first two positions opposite each other and a second inclination at second two positions being between first two positions, thereby forming said second groove presenting said elliptical configuration acting like a track to allow said bearing balls to ride there along and force said bearing balls to move in said wave like mode.

* * * * *